United States Patent
Kestner et al.

(10) Patent No.: US 8,407,788 B2
(45) Date of Patent: Mar. 26, 2013

(54) METHODS AND SYSTEMS FOR IMPLEMENTING A SELF DEFENDING/REPAIRING DATABASE

(75) Inventors: Peter Kestner, Markt Indersdorf (DE); Kurt Lysy, Boise, ID (US)

(73) Assignee: Oracle International Corporation, Redwood Shores, CA (US)

( * ) Notice: Subject to any disclaimer, the term of this patent is extended or adjusted under 35 U.S.C. 154(b) by 613 days.

(21) Appl. No.: 12/475,171

(22) Filed: May 29, 2009

(65) Prior Publication Data

US 2010/0306826 A1    Dec. 2, 2010

(51) Int. Cl.
*G06F 21/00* (2006.01)
(52) U.S. Cl. ............................................. 726/22; 726/23
(58) Field of Classification Search .................. None
See application file for complete search history.

(56) References Cited

U.S. PATENT DOCUMENTS 5,291,598 A * 3/1994 Grundy ........................... 726/28
2008/0072324 A1 * 3/2008 Repasi et al. .................... 726/23

* cited by examiner

*Primary Examiner* — Michael S McNally
*Assistant Examiner* — Carlton Johnson
(74) *Attorney, Agent, or Firm* — Kilpatrick Townsend & Stockton

(57) ABSTRACT

This disclosure describes, generally, methods and systems for self defending and repairing a database. The method includes monitoring, at a database server, code modifications to a database management application. The database management application is configured to maintain the database. The method further includes determining that a code modification has occurred to the database management application. The method further includes checking the code modification for the presence of an authorization key, and in response to an invalid or non-existent authorization key, determining that the code modification is unauthorized. Further, the method includes quarantining the modified code in a secure storage location, and automatically accessing original code of the database management application and replacing the modified code with code from the original code of the database management application.

10 Claims, 5 Drawing Sheets

METHODS AND SYSTEMS FOR IMPLEMENTING A SELF DEFENDING/REPAIRING DATABASE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to database security and, more particularly, to self defending and/or self repairing database security.

BACKGROUND

Generally, securing data stored in a database can be done with encryption, secure access requirements, and the like; however, a significant problem nonetheless exists with such security. This type of security only secures of the data stored within the database, but fails to address security as it relates to the database management software and applications. A significant problem exists when the software management the data within the database is compromised because the intruder is simply able to gain access to the data by modifying the management software, thus circumventing any security placed on the data itself. Hence, improvements are needed in the art.

BRIEF SUMMARY

Embodiments of the present invention are directed to a computer implemented method of self defending and repairing a database. The method includes monitoring, at a database server, code modifications to a database management application. The database management application is configured to maintain the database. The method further includes determining that a code modification has occurred to the database management application. The method further includes checking the code modification for the presence of an authorization key, and in response to an invalid or non-existent authorization key, determining that the code modification is unauthorized. Further, the method includes quarantining the modified code in a secure storage location, and automatically accessing original code of the database management application and replacing the modified code with code from the original code of the database management application.

In a further embodiment, a system for self defending and repairing a database, is described. The system includes a database configured to store data and a secure storage location. The system further includes a database server coupled with the database and the secure storage location. The database server includes a security component. The security component is configured to monitor code modifications to a database management application. The database management application is configured to maintain the database, determine that a code modification has occurred to the database management application, and check the code modification for the presence of an authorization key.

The Database security component is further configured to, determine in response to an invalid or non-existent authorization key, that the code modification is unauthorized, quarantine the modified code in the secure storage location, and automatically access original code of the database management application and replace the modified code with code from the original code of the database management application.

In an alternative embodiment, a machine-readable medium is described. The machine-readable medium includes instructions for self defending and repairing a database. The machine-readable medium includes instructions for monitoring, at a database server, code modifications to a database management application. The database management application is configured to maintain the database.

The machine-readable medium further includes instructions for determining that a code modification has occurred to the database management application. The machine-readable medium further includes instructions for checking the code modification for the presence of an authorization key, and in response to an invalid or non-existent authorization key, determining that the code modification is unauthorized. Further, the machine-readable medium includes instructions for quarantining the modified code in a secure storage location, and automatically accessing original code of the database management application and replacing the modified code with code from the original code of the database management application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Figure 1:
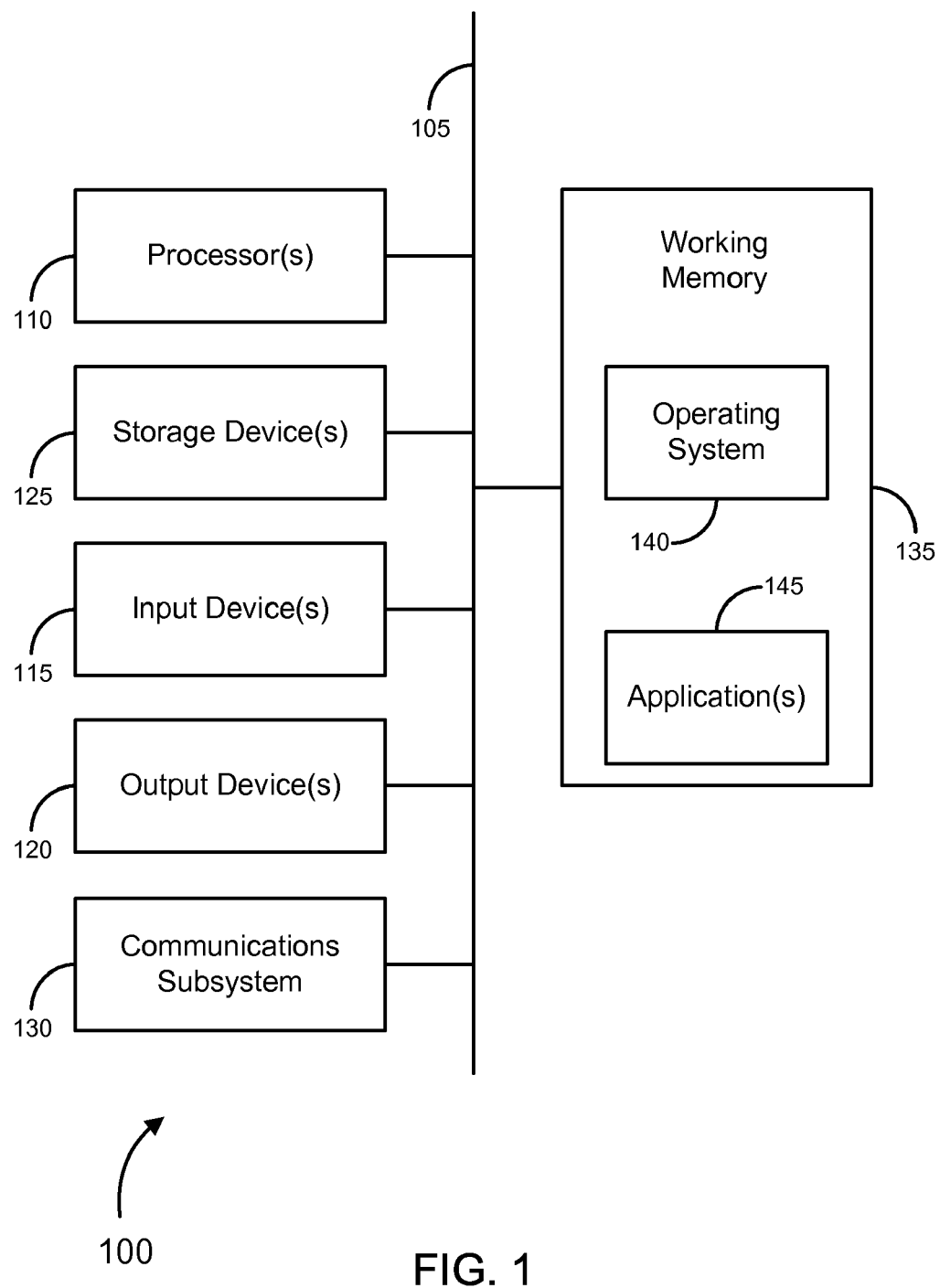
FIG. 1 is a generalized schematic diagram illustrating a computer system, in accordance with various embodiments of the invention.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
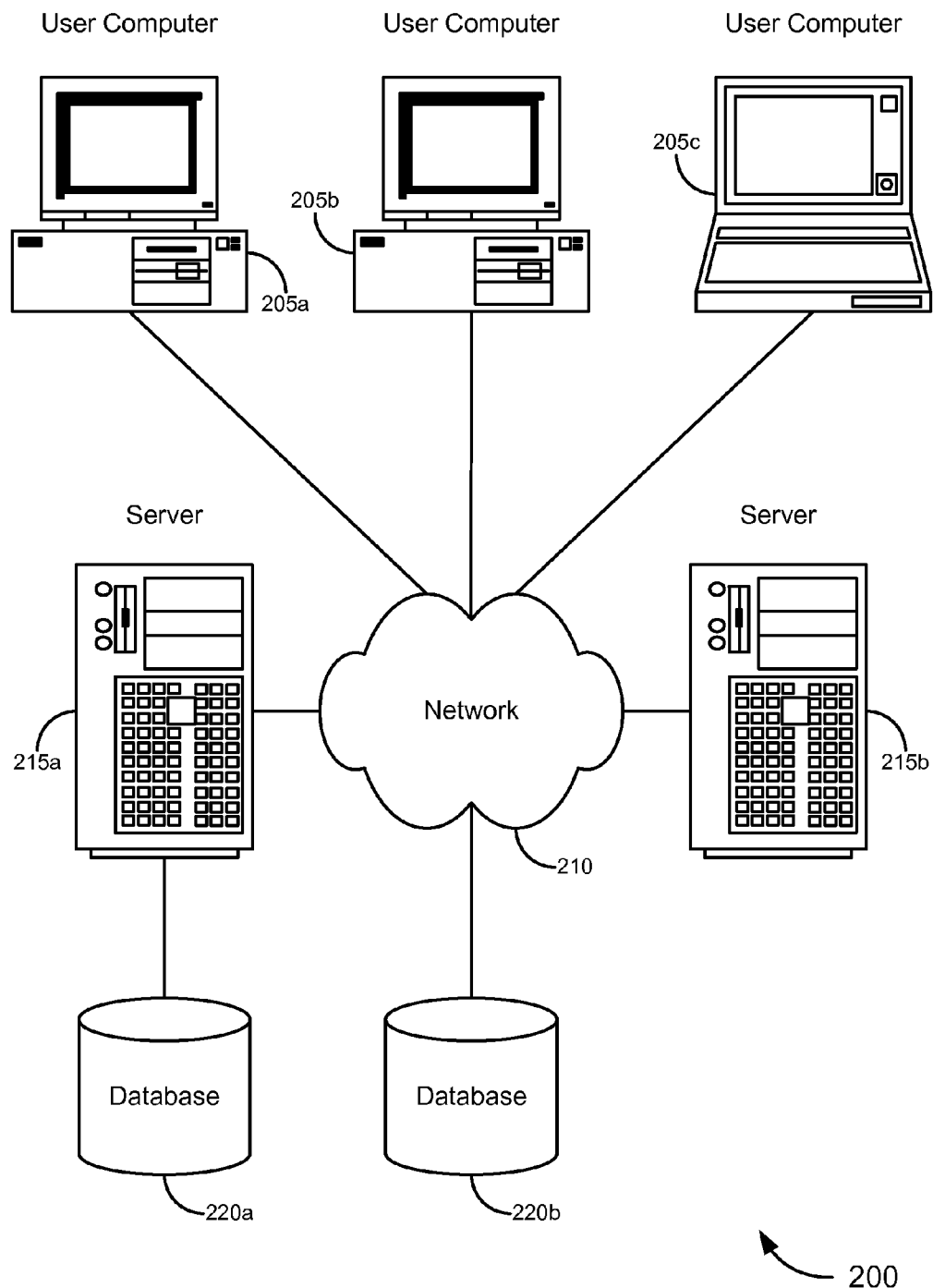
FIG. 2 is a block diagram illustrating a networked system of computers, which can be used in accordance with various embodiments of the invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
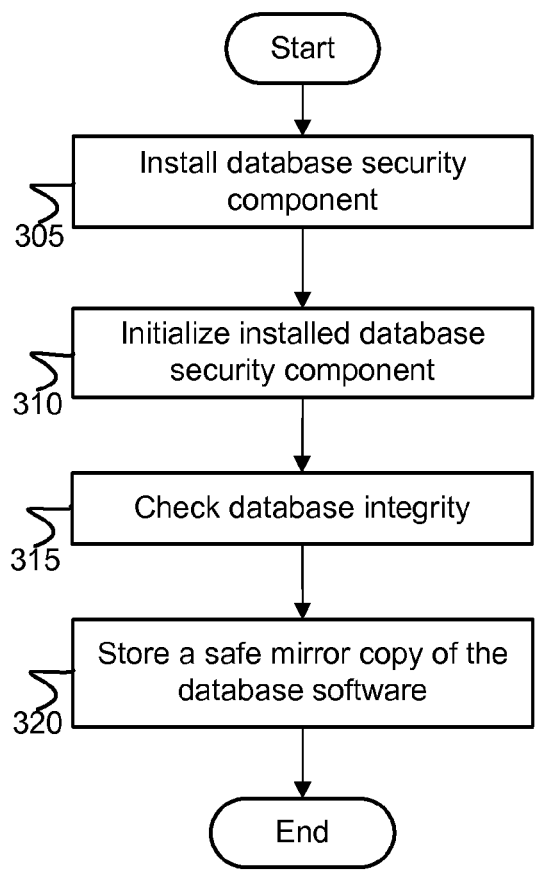
FIG. 3 is a flow diagram illustrating a method of self defending and repairing a database, in accordance with various embodiments of the invention.

Turning now to FIG. 3, which illustrates a method 300 of self defending and repairing of a database. At process block 305, a database security component is installed at a database server. In one embodiment, the database security component may be installed via Oracle™ RunInstaller. Alternatively, the security component may be installed on a server and/or system other than a database server. For example, the security component may run on an enterprise application, a point-or-sale server, and the like.

In a further embodiment, the security component may be configured to monitor software and/or applications running on the database server, in order to identify and repair any modifications to the software (e.g., code modifications). At process block 310, the database security component may be initialized. In one embodiment, the initialization process may include the setting of a variety of options and/or preferences. For example, one option may include the type of defense that will be implemented by the security component. In one embodiment, the security component may be in an "observation mode", which would provide hackers and intruders with a "honey pot." Such a honey pot would allow an administrator to monitor intruders' activities without repairing the changes or alerting the intruders, in order to better protect against future attacks.

Alternatively, a self-defense mode (which also includes the "observation mode") may be used. In this mode any intrusions and/or modifications to the software would be corrected immediately and access to the intruder would be terminated. Furthermore, at process block 315, the integrity of the database and/or database management software may be checked. The integrity check may include, for example, checking whether the installed files on the database server are valid and have not been corrupted and/or inappropriately altered in any way.

At process block 320, a safe mirror copy of the database software is stored in a secure location. The secure location may be an encrypted and/or read-only storage location. The safe mirror copy would store the original software application code and files, which may be accessed in the event of an intrusion which modifies the code and/or files.

Figure 4:
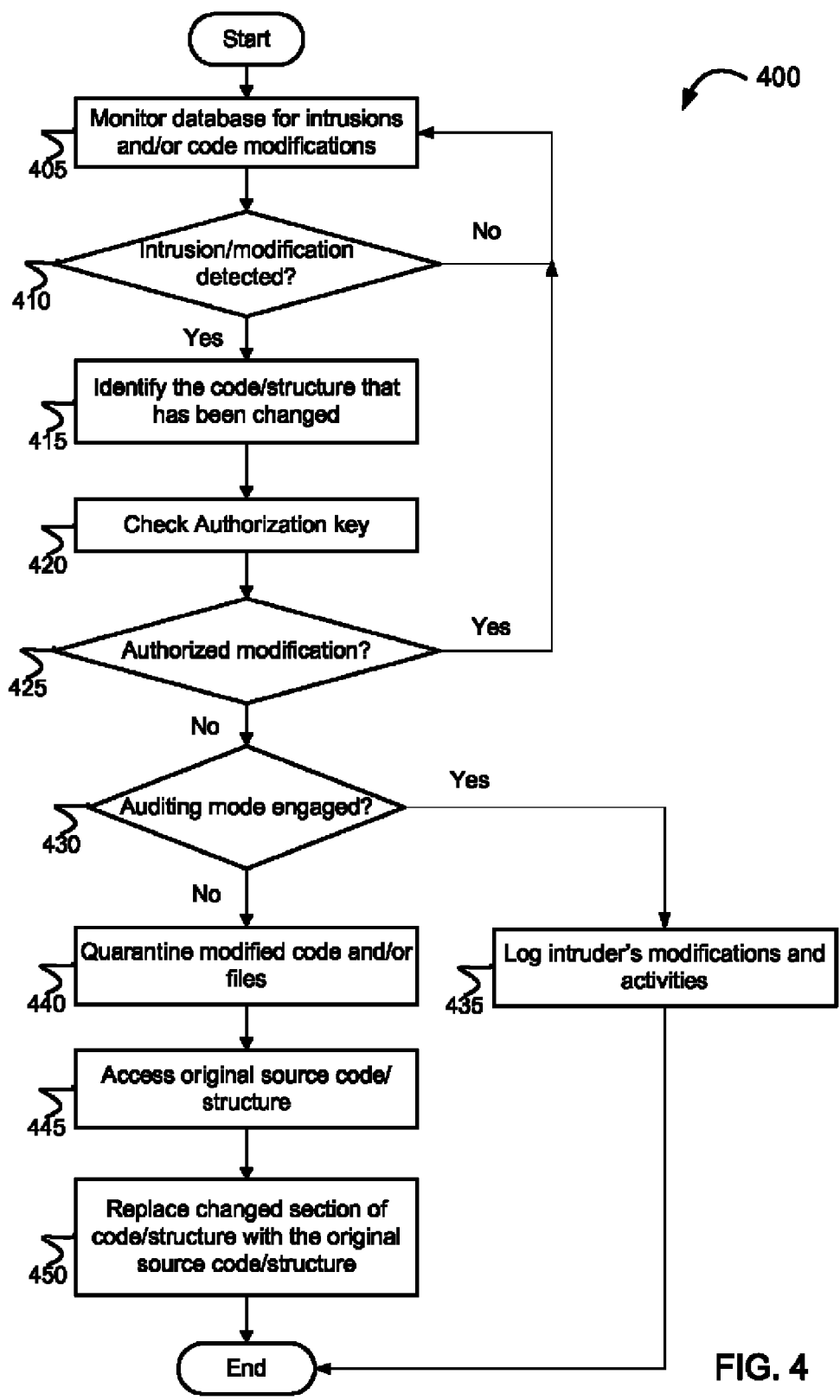
FIG. 4 is a flow diagram illustrating self defending and repairing a database, in accordance with various embodiments of the invention.

Referring next to FIG. 4, which illustrates a method 400 of self defending and repairing of a database. At process block 405, the database management software is monitored for intrusions and/or modifications to the software's code or files. The monitoring checks the integrity of the database management software. Such a check is accomplished by checking the currently running software against the original software (safe mirror copy) stored in the secure location. Hence, if the currently running software differs in any way from the safe mirror copy, the database security component would be alerted of such a change. Thus, at decision block 410, a determination is made whether any such intrusions of modifications have been made.

If no intrusion or code modification has occurred, then the database security component continues to monitor the database management software for modifications (i.e., loop technology). In one embodiment, the component runs in a continuous process, which continues to monitor the integrity of the management software. One advantage to such an implementation is that the management software does not need to be changed, upgraded, etc., but instead the component can be simply installed to work with any existing software and structure. Furthermore, the component may utilize only a small amount of system resources (e.g., only a small amount of memory and 5 megabytes of storage space).

At process block 415, if a modification is identified, then the specific code and/or file(s) that was modified is identified. Further, a check of an associated authorization key is made (process block 420). Such an authorization key may provide an entity to make changes to code and/or files within the database management software. For example, an authorized change may be from an official Oracle™ software update. In such a situation the management software would allow the modifications to occur. Furthermore, the safe mirror copy will be updated to reflect the changes made by the patch or update. Alternatively, unauthorized updates or patches would not possess the proper authorization key, and as such would be treated as an intruder or unauthorized change.

At decision block 425, a determination is made whether the detected modification was authorized. If the modification was authorized, then the security component continues to monitor the database management software for further modifications. Alternatively, if the change is not authorized (i.e., an invalid key was used or no key was used), then at decision block 430, a determination is made whether audit/replace mode is engaged.

If auditing mode is engaged, the administrator desires to monitor an intruder's activities (i.e., a honey pot), and as such any modifications would be allowed to remain and the intruder would not be alerted. Hence, at process block 435, the intruder's modifications and/or activities would be logged and reported for analysis and to assist in taking corrective action.

As such, two possible modes may be implemented. One mode includes auditing (or honey pot/analysis), while the other mode includes protection/self defending and repairing in addition to the auditing mode Hence, the system can either analyze intrusion activities or analyze and protect against such intrusions.

Alternatively, if auditing mode is engaged and in addition a protection/self defending and/or repairing mode, then at process block 440, the modified code and/or file(s) are quarantined and stored in a secure location. The secure location would be inaccessible by the database or the database management software, so that the changes cannot be used by the intruder (or other party) to cause harm to the data stored within the database.

Automatically, and immediately upon detection and removal of the modified code and/or files, the security component accesses the original source code and files from the safe mirror copy (process block 445), and replaces the modified potion of the code and/or files (process block 450). Accordingly, any changes made would be automatically and rapidly changed back to the original state. From identification to removal and replacement takes may take less than, for example, 5 milliseconds (ms); however, the time may be more or less than 5 ms, and 5 ms is simply used for exemplary purposes. This is an insufficient amount of time for any intruder to effectuate any damage, and the management software is continuously maintained in its proper original authorized form.

In a further embodiment, an additional check to ensure that the database security component is still running may be performed. Such a check ensures that the database and database management software are continuously being monitored by the database security component, and not being left unprotected.

Figure 5:
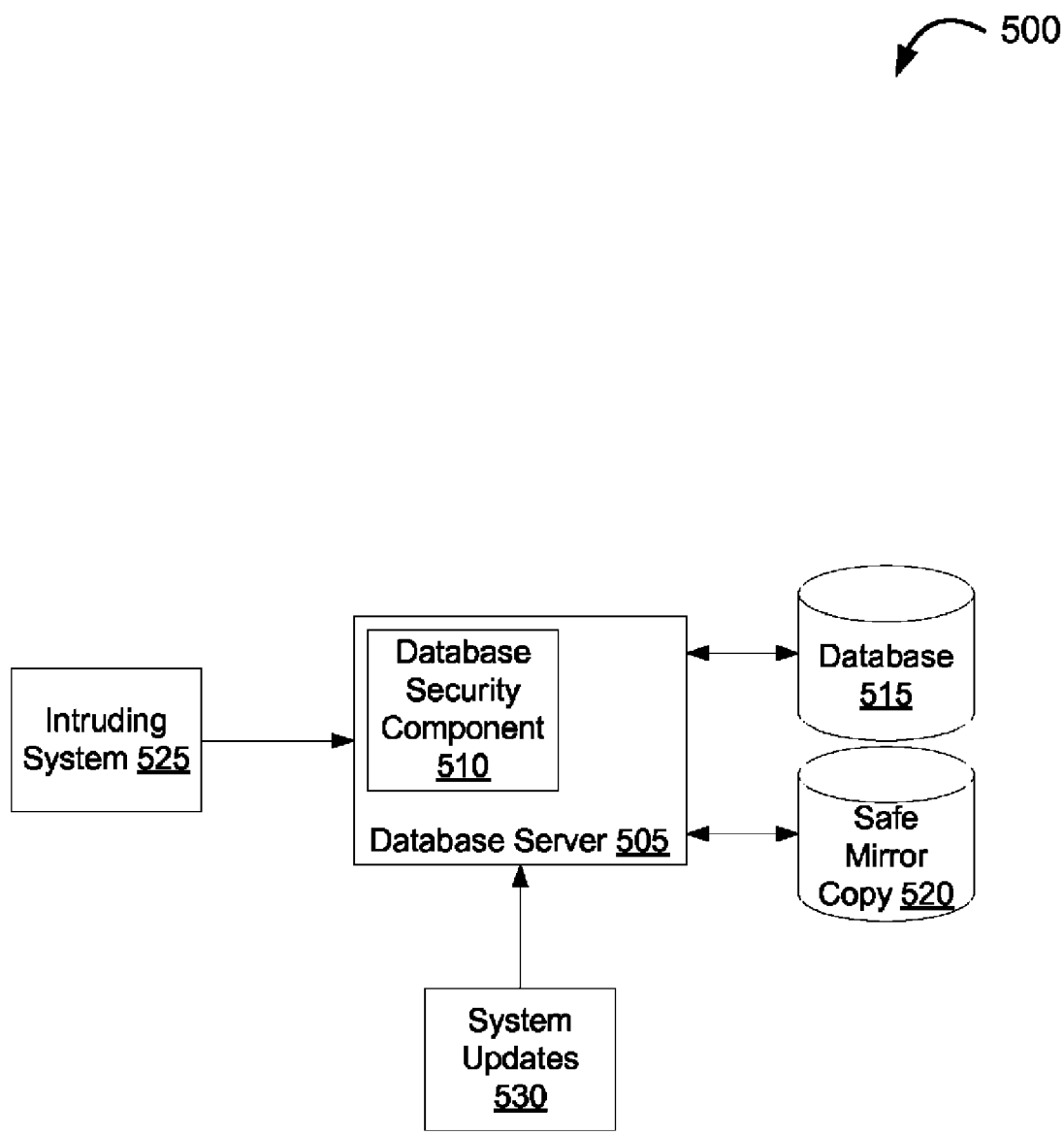
FIG. 5 is a block diagram illustrating a system for self defending and repairing a database, in accordance with various embodiments of the invention.

Now turning to FIG. 5, which illustrates a system 500 for self defending and repairing of a database. System 500 may include a database server 505 which may include a database security component 510. In one embodiment, database security component 510 is configured to execute some or all of the method steps described above in FIGS. 3 and 4. Accordingly, system 500 may further include a database 515, a safe mirror copy 520 (as described above).

In one embodiment, database security component 510 is configured to continuously monitor the integrity of database management software running on database server 505 and maintaining database 515. For example, if an intruding system 525 accesses the database management software code and/or files, and modifies such code and/or files, database security component 510 will identify such a modification. Then, database security component 510 will quarantine the modified code and/or files, and access safe mirror copy 520, and replace the modified code and/or file with the original code and/or files. Thus, any changes made by intruding system 525, will be quickly and automatically reversed by database security component 510. Furthermore, the attempted intrusion may be stored in a "quarantine" location for further review and investigation (i.e., analysis, back trace, forensics, etc.)

Alternatively, a system update 530 may attempt to modify code and/or files. As such, database security component 510 will check system update 530's authorization key to determine if the patch or updated is authorized. If the key is found to be valid, then database security component 510 will allow the modification to be made.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of self defending and repairing a database, the method comprising:
    installing, at a database server, a database security component;
    configuring the database security component in a self-defense mode to monitor database management applications and/or software running on the database server and to immediately identify and repair any modifications to the database management applications and/or software;
    initializing the database security component, wherein the initializing of the database security component includes:
    storing a secure mirror copy of the original source code in a secure, read-only and encrypted storage location, wherein the database security component is configured to monitor the code modifications and replace the modified code with the original code;
    replacing the modified code with the original code prior to executing of the modified code;
    continuously monitoring, at the database server by the security component, for any code modifications to the database management applications and/or software, wherein the database management applications and/or software are configured to maintain the database;
    determining that a code modification has occurred to the database management applications and/or software;
    checking the code modification for the presence of an authorization key;
    in response to an invalid or non-existent authorization key, determining that the code modification is unauthorized;
    quarantining the modified code in a secure storage location; and
    automatically accessing the original code of the database management applications and/or software from the secure mirror copy of the original source code and replacing the modified code with code from the secure mirror copy of the original code of the database management applications and/or software.

2. The method of claim 1, further comprising identifying a code structure associated with the code modification.

3. The method of claim 1, further comprising:
    determining if an auditing mode for the database is engaged; and
    in response to the auditing mode being engaged, allowing the code modification to occur in order to track the intruder's actions.

4. The method of claim 1, wherein, in response to a valid authorization key, the code modification is allowed to remain.

5. The method of claim 4, wherein the code modification is determined to be an authorized update and/or patch to the database management applications and/or software.

6. The method of claim 1, further comprising:
    logging code modification activities; and
    storing the logged activities in an instruction log file.

7. A system for self defending and repairing a database, the system comprising:
    a database configured to store data;
    a secure storage location; and
    a database server coupled with the database and the secure storage location, the database server including a security component, wherein the database server is configured to install the database security component, configure the database security component in a self-defense mode to monitor database management applications and/or software running on the database server and to immediately identify and repair any modifications to the database management applications and/or software, initialize the database security component, wherein the initializing of the database security component includes storing a secure mirror copy of the original source code in a secure, read-only and encrypted storage location, wherein the database security component is configured to monitor the code modifications and replace the modified code with the original code, replace the modified code with the original code prior to executing of the modified code, and wherein the security component is configured to continuously monitor code modifications to the database management applications and/or software, wherein the database management applications and/or software are configured to maintain the database, determine that a code modification has occurred to the database management applications and/or software, check the code modification for the presence of an authorization key, in response to an invalid or non-existent authorization key, determine that the code modification is unauthorized, quarantine the modified code in the secure storage location, and automatically access the original code of the database management applications and/or software from the secure mirror copy of the original source code and replace the modified code with code from the secure mirror copy of the original code of the database management applications and/or software.

8. A non-transitory machine-readable medium having sets of instructions stored thereon for self defending and repairing a database which, when executed by a machine, cause the machine to:
  install, at a database server, a database security component;
  configure the database security component in a self-defense mode to monitor database management applications and/or software running on the database server and to immediately identify and repair any modifications to the database management applications and/or software;
  initialize the database security component, wherein the initializing of the database security component includes:
  store a secure mirror copy of the original source code in a secure, read-only and encrypted storage location, wherein the database security component is configured to monitor the code modifications and replace the modified code with the original code;
  replace the modified code with the original code prior to executing of the modified code;
  continuously monitor, at the database server by the security component, for any code modifications to the database management applications and/or software, wherein the database management applications and/or software are configured to maintain the database;
  determine that a code modification has occurred to the database management applications and/or software;
  check the code modification for the presence of an authorization key;
  in response to an invalid or non-existent authorization key, determine that the code modification is unauthorized;
  quarantine the modified code in a secure storage location; and
  automatically access the original code of the database management applications and/or software from the secure mirror copy of the original source code and replacing the modified code with code from the secure mirror copy of the original code of the database management applications and/or software.

9. The non-transitory machine-readable medium of claim 8, wherein the sets of instructions, when further executed by the machine, cause the machine to identify a code structure associated with the code modification.

10. The non-transitory machine-readable medium of claim 8, wherein the sets of instructions, when further executed by the machine, cause the machine to:
  determine if an auditing mode for the database is engaged; and
  in response to the auditing mode being engaged, allow the code modification to occur in order to track the intruder's actions.

* * * * *

UNITED STATES PATENT AND TRADEMARK OFFICE
CERTIFICATE OF CORRECTION

PATENT NO. : 8,407,788 B2
APPLICATION NO. : 12/475171
DATED : March 26, 2013
INVENTOR(S) : Kestner et al.

Page 1 of 1

It is certified that error appears in the above-identified patent and that said Letters Patent is hereby corrected as shown below:

In the Specification:

In column 1, line 33, delete "itself" and insert -- itself. --, therefor.

Signed and Sealed this
Ninth Day of July, 2013

Teresa Stanek Rea
*Acting Director of the United States Patent and Trademark Office*